United States Patent
McFadden

(10) Patent No.: US 10,747,836 B2
(45) Date of Patent: Aug. 18, 2020

(54) APPARATUS AND METHODS FOR CONTROLLING AND OPTIMIZING INFORMATION DISTRIBUTION BETWEEN USERS IN AN INFORMATION EXCHANGE

(71) Applicant: Brian David McFadden, New York, NY (US)

(72) Inventor: Brian David McFadden, New York, NY (US)

(73) Assignee: CYBERNETIC MEDIA SYSTEMS, LLC, Dover, DE (US)

( * ) Notice: Subject to any disclaimer, the term of this patent is extended or adjusted under 35 U.S.C. 154(b) by 0 days.

(21) Appl. No.: 16/221,532

(22) Filed: Dec. 16, 2018

(65) Prior Publication Data

US 2019/0129911 A1    May 2, 2019

Related U.S. Application Data

(62) Division of application No. 14/215,034, filed on Mar. 16, 2014, now Pat. No. 10,318,596.

(60) Provisional application No. 61/852,280, filed on Mar. 15, 2013.

(51) Int. Cl.
    *G06F 16/9535* (2019.01)
(52) U.S. Cl.
    CPC ................ *G06F 16/9535* (2019.01)
(58) Field of Classification Search
    CPC .................................. G06F 16/9535
    USPC ........................................ 707/736
    See application file for complete search history.

(56) References Cited

U.S. PATENT DOCUMENTS

| | | | | |
|---|---|---|---|---|
| 7,877,387 B2* | 1/2011 | Hangartner | ............ | G06Q 30/02 707/736 |
| 8,612,477 B2* | 12/2013 | Becker | ................... | G06Q 30/00 707/770 |
| 8,862,568 B2* | 10/2014 | Badros | ................... | G06Q 30/02 707/706 |
| 10,318,596 B2* | 6/2019 | McFadden | .......... | G06F 16/9535 |
| 10,510,043 B2* | 12/2019 | Gerace | .................. | G06Q 30/02 |

(Continued)

FOREIGN PATENT DOCUMENTS

WO    WO2010078539 A2    7/2010

OTHER PUBLICATIONS

Sturman, David, J., Matching and scoring of advertisements for targeted delivery into multiple video games, such as single and multiplayer games, Application No. 12001279.4; EP 2 463 001 A2; Date of filing: Aug. 3, 2005 (Year: 2005).*

(Continued)

*Primary Examiner* — Mohsen Almani

(57) ABSTRACT

An automatic control system for regulating the information exchange between information producer and information consumer. One control mechanism can dynamically refine the decision to include or exclude information items from the consumer information stream to improve success metrics like participation. One or more system interface request control mechanisms can dynamically provide incentive and limits for the input of audience targets, priorities, preferences, and other data. An administrator may set parameters and select success metrics to balance the goals of the information exchange participants and stakeholders. The system can also serve to resolve conflicts between the selection criteria of a consumer and the audience targets of a producer.

11 Claims, 6 Drawing Sheets

(56) References Cited

U.S. PATENT DOCUMENTS

| | | |
|---|---|---|
| 2005/0234765 A1 | 10/2005 | Blumberg et al. |
| 2008/0027738 A1 | 1/2008 | Friedrichowitz et al. |
| 2009/0307093 A1 | 12/2009 | Bertoni et al. |
| 2011/0040720 A1* | 2/2011 | Zangwill ............... G06N 5/04 706/52 |
| 2011/0161162 A1* | 6/2011 | Ketchum ............... G06Q 30/02 705/14.43 |
| 2012/0078899 A1* | 3/2012 | Fontana ............... G06F 16/78 707/736 |
| 2012/0185492 A1* | 7/2012 | Israel ............... G06F 16/9558 707/754 |
| 2013/0138514 A1* | 5/2013 | Yan ............... G06Q 30/0241 705/14.71 |
| 2014/0317112 A1* | 10/2014 | Maharajh ............... G06F 16/957 707/736 |

OTHER PUBLICATIONS

Stata.com; bottom to top or reverse cumulative distribution in table command?; http://www.stata.com/statalist/archive/2010-01/msg00642.html (Year: 2010).*

* cited by examiner

Basic Decision Matrix - 70A

|  |  | Consumer | | |
|---|---|---|---|---|
|  |  | W | O | DW |
| Producer | S | I | I | E |
|  | O | I | ? | E |
|  | DS | E | E | E |

S-Send, DS-Do Not Send, W-Want DW- Do Not Want, O-Open
I - Include, E - Exclude, ? - System Decides

FIG. 5

Decision Matrix With Priorities - 70B

|  |  | Consumer | | | | | | |
|---|---|---|---|---|---|---|---|---|
|  |  | W-H | W-M | W-L | O | DW-L | DW-M | DW-H |
| Producer | S-H | I | I | I | I? | E? | E? | E |
|  | S-M | I | I | I? | I? | E? | E | E |
|  | S-L | I | I? | I? | I? | E? | E | E |
|  | O | I? | I? | I? | ? | E? | E | E |
|  | DS-L | E? | E? | E? | E? | E? | E | E |
|  | DS-M | E? | E | E | E | E | E | E |
|  | DS-H | E | E | E | E | E | E | E |

S-Send, DS-Do Not Send, W-Want DW- Do Not Want, O-Open
H-High M-Medium L-Low
I - Include, E - Exclude, ? - System Decides
I? - Default to Include System but Overrides, E? - Default to Exclude but System Overrides

FIG. 6

Decision Matrix with Continuous Priorities - 70C

|  |  | Consumer | | |
|---|---|---|---|---|
|  |  | W | O | DW |
| Producer | S | f1(wp,sp) | f8sp) | f7(dwp,sp) |
|  | O | f2(wp,O) | f9(O,O) | f6(O,dwp) |
|  | DS | f3(wp,sp) | f4(dsp) | f5(dwp,dsp) |

S-Send, DS-Do Not Send, W-Want DW- Do Not Want, O-Open
f1 thru f9 - logical functions
wp - Consumer's want priority, dwp - Consumer's do not want priority,
sp - Producer's send priority.
dsp - Producer's do not send priority

FIG. 7

APPARATUS AND METHODS FOR CONTROLLING AND OPTIMIZING INFORMATION DISTRIBUTION BETWEEN USERS IN AN INFORMATION EXCHANGE

CROSS-REFERENCE TO RELATED APPLICATIONS

This application claims the benefit of provisional patent application No. 61/852,280 filed Mar. 15, 2013 By Brian D McFadden and also parent application Ser. No. 14/215,034 filed on Mar. 16, 2014.

BACKGROUND

A major drawback in services where users or members exchange information, such as social networks, user groups, list servers, forums, question and answer services, and the like, is the inability to more precisely and optimally regulate the flow of information between producers and consumers. Some practices are in place to make these exchanges manageable and relevant to participants, but these lack the automated dynamic refinements needed to potentially optimize or generally improve the objectives of the stakeholders. Other services where one group is exchanging information with another group such as news aggregation services, newspapers, magazines, media, ad networks, blogs, research services, and the like face a similar problem.

One of the partial solutions used by many information exchanges is to add group, tags, or topics that information consuming users can subscribe to or use to filter the set of information available to them. This is an improvement not a full solution as increasing the number of topics to decrease the rate of information produced per topic still leaves an inefficiency as consuming users must choose between lower rate of information flow and potentially losing some valuable information items from peripheral topics. Once they subscribe to the peripheral topics the information rate and value dilution increases. Even if an information consumer's interests are contained in a single topic there will still be a degree of variability of interest that could lead to an inefficiency particularly if there are many information items in the given topic.

Another problem with relying only on the topic approach is getting information consuming users to specify a selection of topics. This is particularly problematic in light of changing and evolving ontologies of topics. Techniques are often employed to gain preferences or interests that are reveled from prior actions of activities of the users. A wide variety of methodologies are available, both public and proprietary, to identify items of interest based on past behaviors and interactions (for example click and view histories), collaborative filtering recommendations, machine learning, and others. These methods yield a set of preferences for the information consumer that may be in conflict or have varying ranges of applicability and accuracy of results. The uncertainty of the derived preference will vary as well. To accommodate these types of scenarios preferences are often ranked and applied in order of ranking. This approach has limits by not considering dynamic external factors, the state of the information exchange, the producer of the information item and their targeting preferences for the information item. These and other factors might have an influence on the applicability of the preference of the information consumer particularly when there is prediction uncertainty of the derived preference.

Another contributing problem is the practice of many information exchanges to reduce or eliminate any restrictions for information producers to enter information items. This approach encourages quantity but also leads to variable quality of contributions that ultimately lower the value to the potential consumers in the exchange and extenuates the problems stated heretofore. This situation may not be altered significantly even when there is a monetary assessment on the contribution. While payment is a restriction that may correlate with quality it does not assure that a more optimal quality level is achieved.

While a number of ways are available to control the information flow to users and allow users to self throttle the information flow, they are mostly suboptimal, non-dynamic, and ineffective in many cases.

BRIEF DESCRIPTION OF DRAWINGS

FIG. 6. An exemplary embodiment of decision matrix with action priorities
FIG. 7. An exemplary embodiment with continuous priorities.

DETAILED DESCRIPTION

Figure 1:
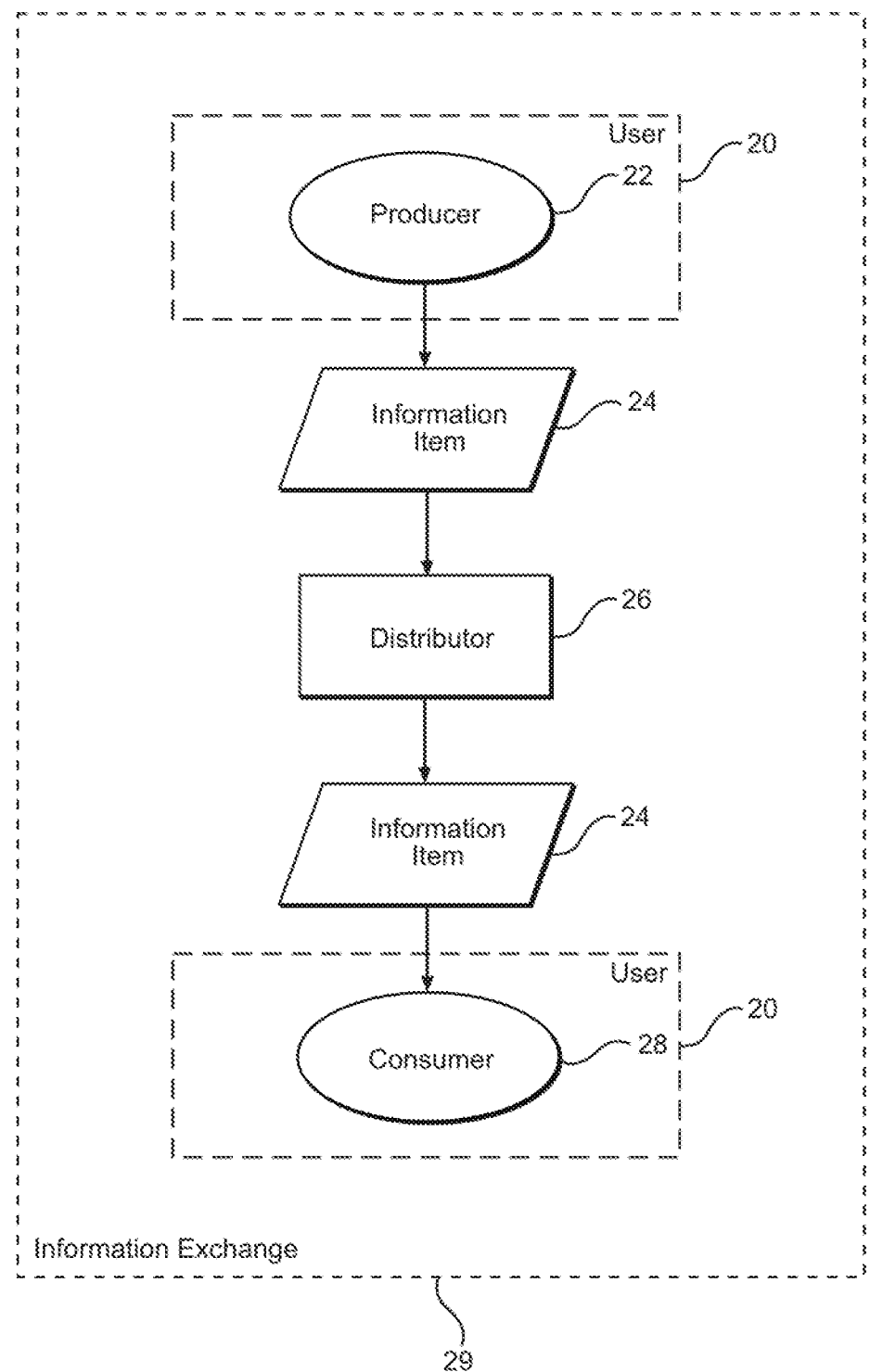
FIG. 1. Describes an example of an information exchange
FIG. 2. Describes an example of the producer interactions
FIG. 3. Describes an example of the interactions of a general user
FIG. 4. Describes an example of the interactions of the consumer
FIG. 5. Describes an example of a basic decision matrix with not action priorities shows audience targets down the vertical for producer and along the horizontal.

An example of an information exchange 29 is shown in FIG. 1. A user 20 of the information exchange 29 may be either an information producer 22 or an information consumer 28 or both. The information exchange 29 delivers an information item 24 from the information producer 22 to the information consumer 28. In the most general definition a information exchange consists of one or more producers, one or more consumers and a distributor 26. The distributor 26 specifies how the information items flow from producer to consumer.

The distributor 26 can take multiple forms, for example an information switch including simple pass through, publisher to consumer, sender to receiver, publish-subscribe, or any other form where information is transferred from a producer to a consumer. The distributor 26 would include for example cases where the consumer friends or follows one or more producers or joins a group or where a producer and consumer have agreed to follow or friend or exchange information with each other and allow the other party to do the same. The distributor 26 may support subscriptions or not. If subscriptions are supported, the consumer 28 may be subscribed to one, several or all producers. If the distributor 26 does not support subscriptions the consumer 28 will be able to receive from all producers. There may be one or multiple producer 22. There may be one or multiple consumer 28. The information exchange 29 could be a social network, a group within a social network, a list server, a news aggregation service, a news feed, a newsletter, a digest, offers, alerts, an ad exchange, an ad network, email client, news reader, web browser, portal or any service that facilitates a flow of information items from producers to consumers.

The producer 22 is the user 20 who will send, post, place, contribute, publish, author, create, direct, respond, or otherwise cause information to be distributed to, or made viewable by, one or more other users of the information exchange. FIG. 1 is not intended to show every detail of the information flow.

The information consumer 28 is the user who will receive information items originating from the producers. The consumer 28 may or may not consume the information items made available to them.

Note that the labels producer and consumer are relative to information production and information consumption and in no way imply a commercial relationship.

The information item 24 can be a message, email, notice, response, video clip, audio clip, news, article, story, solicitation, offer, advertisement, URL, or any other form of communication that can be sent or made available by a producer to a consumer.

An information stream is a collection or set of information items delivered sequentially or together to a consumer 28, either directly or embedded, via a medium including, but not limited to, print, email, web feeds, mobile messaging, video, audio, broadcast, or via any other means of delivering information.

Figure 3:
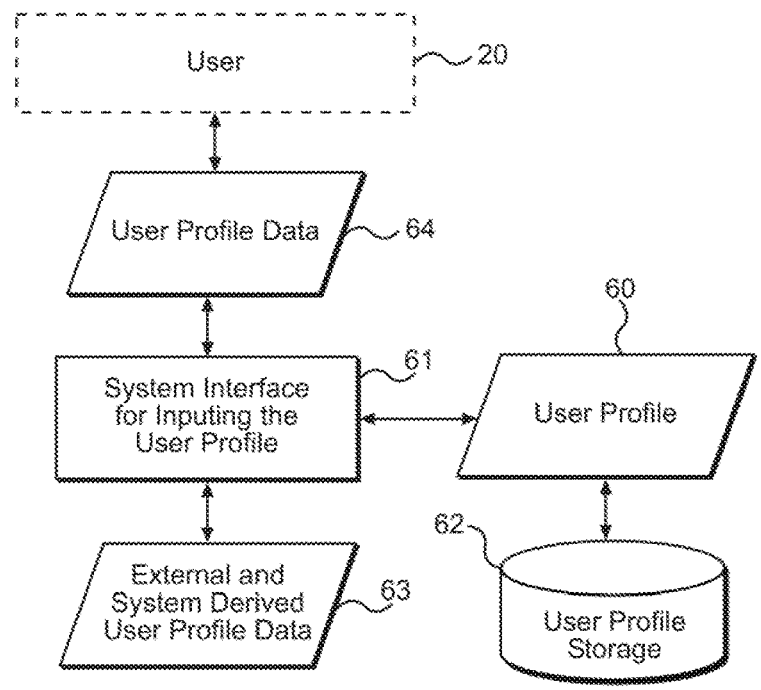

In FIG. 3 shows an example of an information exchange 29 where user 20 may enter user profile data 64 into a system interface for inputting the user profile 61. The system interface for inputting the user profile 61 stores the user profile 60 in a user profile storage 62. The user profile storage may be an internal part of the information exchange, external to the information exchange, or a combination of internal and external. A set of system derived user profile data 63 can also be stored in the user profile storage 62, and in some system, the user may not input any user profile data.

A user profile 60 includes available information, not limited to form, about the user. This includes but is not limited to behavior, biographic, demographic, historical, ratings, feedback, tracking, or other general or specific information from sources internal and external to the information exchange 29. The form for the user profile storage includes relational database, name value pair, no-sql, hierarchical data, objects, nested objects, nested hierarchical data, or combination of databases in a single source or in multiple sources. If accessible via an API the user profile 60 may be represented by XML, JSON, CVS, or any other data representation.

Figure 4:
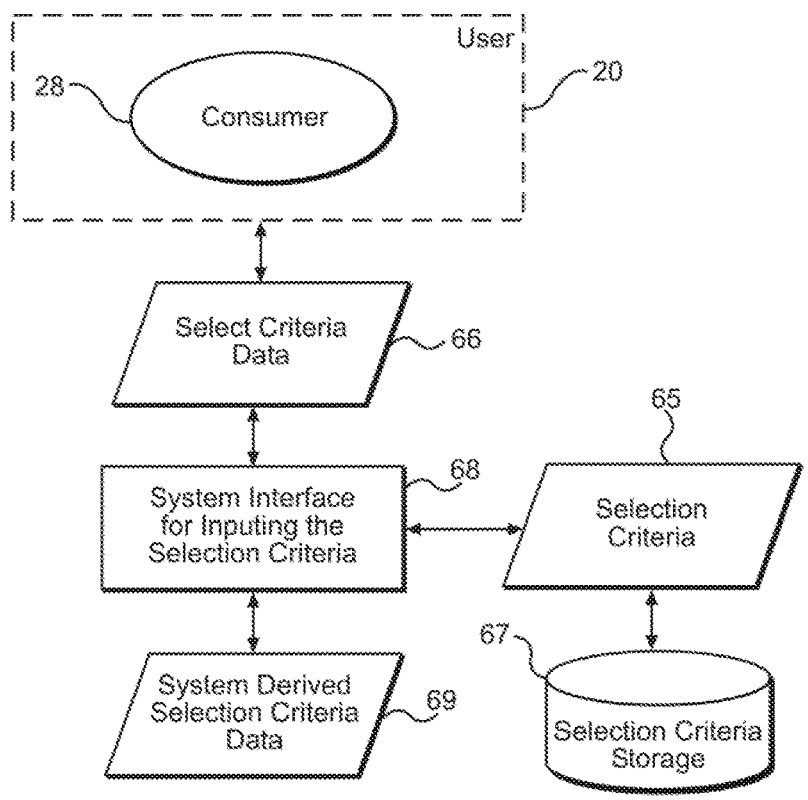
Figure 8:
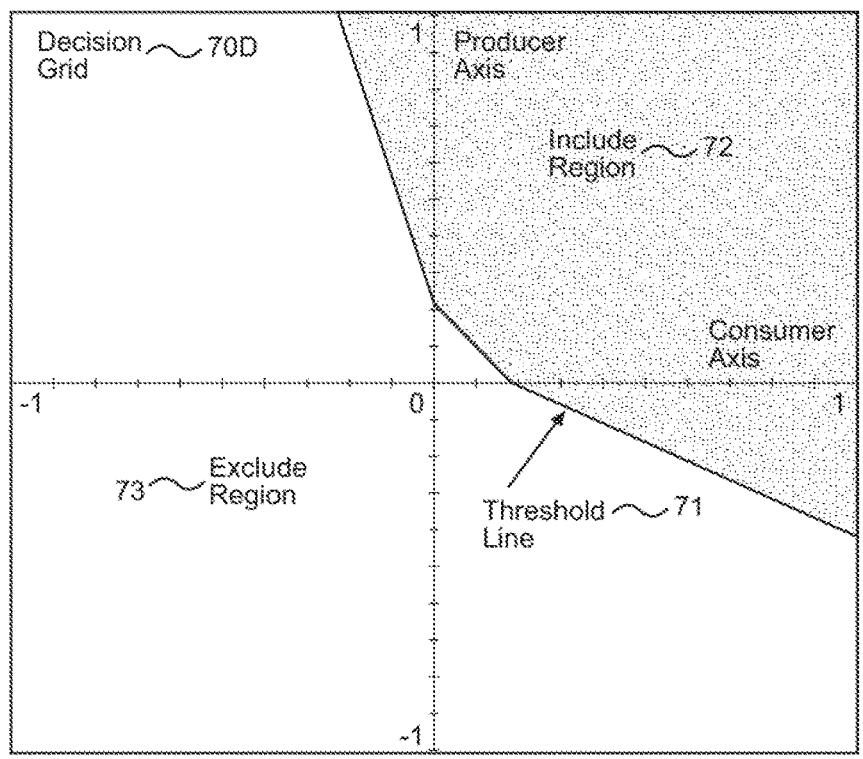
FIG. 8. Describes include region and threshold line for a decision grid or decision matrix
FIG. 9. Describes the audience size limits
FIG. 10. Describes the system interface for inputting the audience targets

The consumer 28 in FIG. 4 may enter a selection criteria data 66 into a system interface for inputting the selection criteria 68, and a selection criteria 65 is stored in a selection criteria storage 67. The selection criteria 65 can indicate the type or set of information items that the consumer is potentially interested in or not interested in receiving. The system interface for inputting the selection criteria 68 stores the selection criteria in a selection criteria storage 67. The selection criteria storage 67 can be internal to the information exchange 29, external to the information exchange 29, or a combination of internal and external. Selection criteria can also include a system derived selection criteria 69 that can also be stored in the selection criteria storage 67. In one embodiment, the selection criteria may be stored with the user profile data and the user profile storage and selection criteria storage may be the same.

In one embodiment, the selection criteria storage and user profile storage may be stored together on contiguous storage for fast access and processing.

Figure 2:
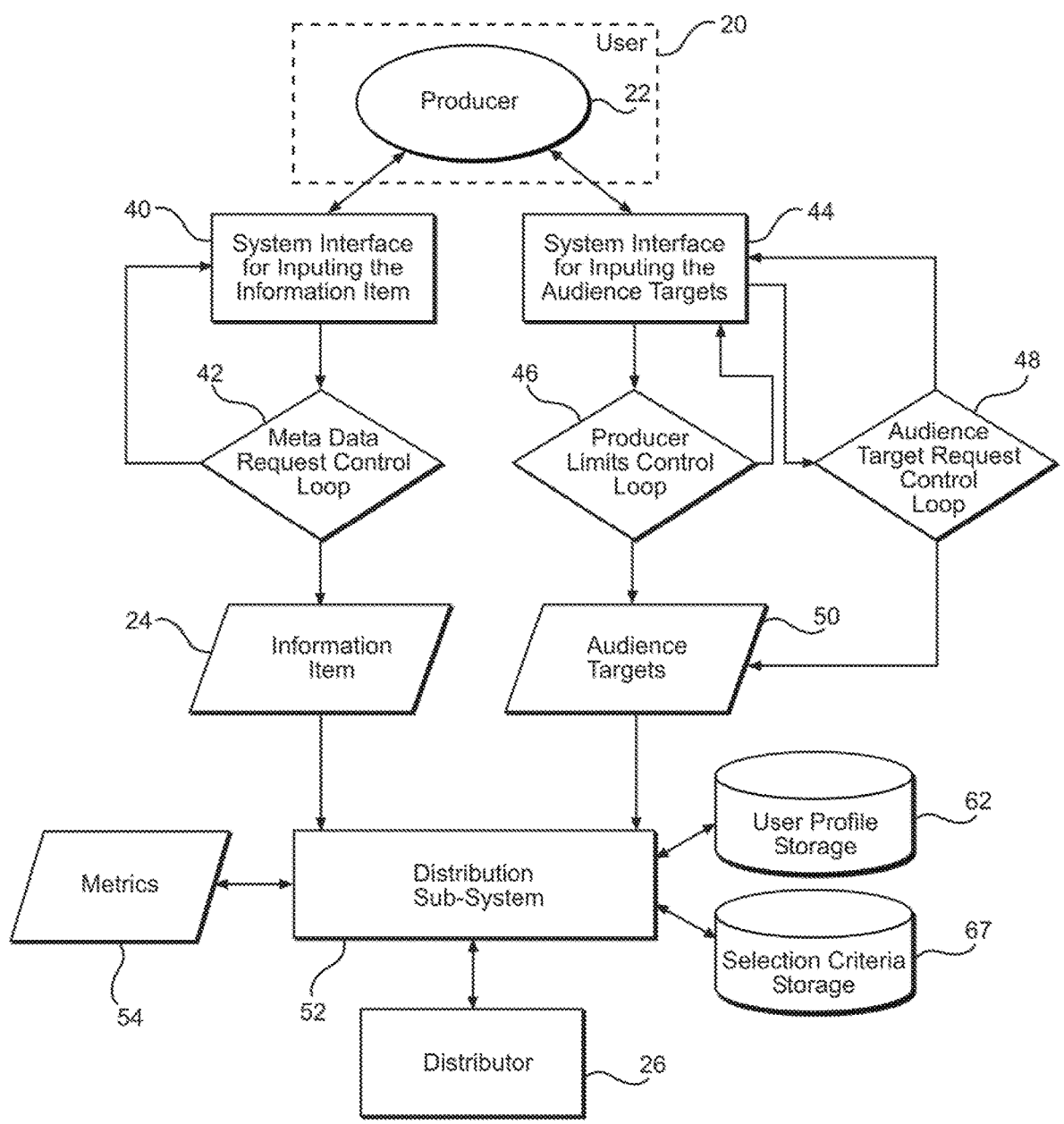

In FIG. 2, audience targets 50 define a set of consumers or audiences that a producer 22 would like to reach or not reach. A system interface for inputting the audience targets 44 interacts with a producer limits control loop 46 and an audience target request control loop 48. The producer limits control loop 46 and the audience target request control loop 48 regulate the audience targets 50 included with an information item 24 to be processed by a distribution sub-system 52.

In FIG. 2, a system interface for inputting the information item 40 receives an information item 24 from the producer 22. A meta data request control loop 42 interacts with the system interface for inputting the information item 40 and regulates the amount of additional descriptive data that is collected when an information item 24 is entered. In FIG. 2, the distribution sub-system 52 processes the information item 24, audience targets 50, a set of metrics 54, user profiles from the user profile storage 62, and selections criteria from the selection criteria storage to determine what consumers should get, receive, or view the information item as described below. The metrics 54 may be measures, statistics, and parameters obtained, in direct or computed form, from one or more sources internal or external to the information exchange.

In one embodiment, the distribution sub-system 52 and the distributor 26 can be the same. In another embodiment, they may be separate.

Operational Description

In one embodiment, the system described here is the information exchange or an integral part of the information exchange. In another embodiment, the system will exist separately from the information exchange as a sub-system interacting with the information exchange as detailed below.

In one embodiment, the system is computer coded software operating on a computer system. The computer system can be any combination of one or more physical computer hardware systems, physical servers, devices, mobile devices, CPUs, auxiliary CPUs, embedded processors, workstations, desktop computers, virtual devices, virtual servers, virtual machines, or similarly related hardware with an applicable operating system appropriate for the specific hardware and, in the case of more than one, interconnected via a private or public network.

In one embodiment, the system may operate as a self regulated automatic control system.

The Producer

In one embodiment, the producer may enter the information item 24 into a system interface for inputting the information item 40. The information item consists of contents and a meta description. The contents can include summary, title, full story, image, video, audio, rich media, or other primary information delivery object. The meta description can include abstract, source, keywords, authors, bylines, related links, topics, subjects, types, restrictions, pricing or any other fields or objects or hierarchical data used to classify, categorize, track, identify or otherwise describe the contents and the information item. In one embodiment, the meta data description and the information item may be the same.

In one embodiment, the producer may enter the audience target into the system interface for inputting the audience targets 44. The audience target describes the consumers that the producer would like to reach or not reach. The specification of an audience target can reference any aspect of the user profile to specify the potential consumer. The audience target will have an action to specify if the user matching the audience target should receive the information or not. In one embodiment, the system interface for inputting the information item and the system interface for inputting the audience targets may be the same.

In one embodiment, the producer may specify one or more additional audience targets that they want. The first audience target is the primary set of users the consumer wants to include or exclude. Each additional audience can have less priority than prior audiences selected.

In one embodiment, the producer 22 may construct an audience target and priority by selecting one or more parameters from available data in the user profile of the consumer and assign a priority to values for each discrete parameters and range of values for continuous parameters. The max and min values for all combination of field values may be used to determine a normalized priority scale.

In one embodiment, the producer may first target the largest audience they want to reach. The system may set a limit that is less than the size of the audience specified by the first audience target. In one embodiment, the limit may be determined by the context of the message, the past history of interactions with the prior messages from the producer, and current system-wide metrics. In another embodiment, the system may adjust the limit in exchange for payment or some other concession from the producer. In one embodiment, the producer may specify an additional audience target to reach an audience closer in size to the limit. If the size of the audience is less than the limit, the audience target may be used as entered and assigned a priority. In one embodiment, if the size of the audience is greater than limit the system will refine the target to make the audience target meet the limit or adjust the priority of the audience target. In one embodiment, the system may adjust the priority for the audience target if the size exceeds the limit. In one embodiment, the producer may scale the priority based on one or more discrete or continuous parameters used in the profile of the consumers.

In one embodiment, the producer may have an archive of predefined audience targets that can be selected instead of entering and creating new audience targets.

In one embodiment, the information items and audience targets may be sent to a distribution sub-system. In one embodiment, the distribution sub-system may be integral with the information exchange distributor. In another embodiment, the distribution sub-system can be external to the information exchange distributor.

In one embodiment, the producer's audience targets may be required. In another embodiment, the producer's audience targets may be optional.

In one embodiment, producers may use visual input sliders to indicate audience targets and priorities for specific profile attributes. For example, an audience target with higher priority targets based by years of experience of the consumer. In another embodiment, producers may use drag and drop visuals to rank audience targets and set audience target priorities.

In one embodiment, the producer's entered audience target may be applied to single information item, multiple information items, or all information items from that producer.

In one embodiment, the producer may be an autonomous agent.

The User

In one embodiment, the user, producer and consumer, may enter data into the user profile 60. In another embodiment, the user profile 60 may also include system data and information about the user including, but not limited to, performance, behavioral, history, tracking, or any other information that the system can record or compute for a user. In another embodiment, the user profile may also include external information obtained from external systems including, but not limited to, performance, behavioral, history, tracking, records, or any other information that can be obtained or computed from external systems or combined with internal profile data. In another embodiment, the user profile may have data from all data sources.

The information exchange user 20 may enter user profile data 64 into a system interface for inputting the user profile 61. The system interface for inputting the user profile 61 stores the user profile data 64 in a user profile storage 62. In one embodiment, the user profile storage may be part of the information exchange 29. In another embodiment, the user profile storage 62 may be external to the information exchange 29. In another embodiment, the user profile storage 62 may be distributed between the information exchange 29 and external to it. In one embodiment, external and system derived user profile data 63 may be stored in the user profile storage 62.

The Consumer

In one embodiment, the consumer may enter the selection criteria that defines the type of information item and may also define a type of producer. In another embodiment, the selection criteria may only specify a type of information item or type of producer. In one embodiment, the consumer may enter an action for the selection criteria to specify if the information items matching the criteria are items they would want to receive or not receive. In another embodiment, the action assigned to the selection criteria may be assigned by the system from behavior actions of the consumer. For example, by the consumer expressing interest in an a related item or meta data topic.

The consumer can enter more than one selection criteria. In one embodiment, if more than one selection criteria is specified the consumer may specify a priority to define how important the criteria is. Priorities can be expressed by ordering the criteria or by selecting a priority preference input. In another embodiment, the priority of the selection criteria may be assigned by the system from the context of the inputed or derived selection criteria or the behavior, history, or actions leading to the creation of the selection criteria.

The selection criteria may also overlap and conflict. For example, a conflict between criteria may arise if two selection criteria match and one criterion says to include a specific item and another criterion says to exclude it. In one embodiment, the conflict may be resolved by preference to the highest priority selection criteria. In one embodiment, the priorities may be combined in a mathematical function to determine the priority with the exclude priority optionally multiplied by −1. The function may consider higher weighting for higher priorities or may simply average the priorities. If both priorities are the same in a conflict, it may be treated as unresolved or open. In another embodiment the conflict may be resolved by the system depending on optimization criteria discussed below.

In one embodiment, selection criteria and priority for the selection criteria may be determined from performance, historical, behavioral, or tracking data of the consumer. In another embodiment, selection criteria and priority may be determined from predictive statistical methods. In another embodiment, selection criteria entered by the consumer may be combined with selection criteria determined from all other means.

In one embodiment, priorities may be set by the system for each selection criteria. In another embodiment, the system sets a default priority for the selection criteria that can be changed by the consumer.

In one embodiment, the processing of the consumers selection criteria may be integral with the information exchange distributor. In another embodiment, the processing may be external to the default distributor.

In one embodiment, the consumer's selection criteria may be entered by a human. In another embodiment, the selection criteria may be entered by an autonomous agent.

The consumer may enter the selection criteria into a system interface for inputting the selection criteria. The system interface for inputting the selection criteria 68 stores the selection criteria in a selection criteria storage 67. In one embodiment, the selection criteria storage 67 may be part of the information exchange. In another embodiment, the selection criteria storage 67 may be external to the information exchange. In another embodiment, the selection criteria storage 67 may be distributed between the information exchange and external to it. In one embodiment, system derived selection criteria 69 may be stored in the selection criteria storage 67.

In one embodiment, consumers use drag and drop visuals to rank selection criteria and set selection criteria priorities.

In one embodiment, the consumer may be an autonomous agent.

Decision Matrix

In one embodiment, a decision matrix 70 may be used to determine if the information item 24 should be included in the information stream of the consumer 28.

FIG. 5 shows the decision matrix 70a for a basic case with no audience target priorities or selection criteria priorities.

In FIG. 5, the producer's 22 actions for the two audience targets 50 are shown along the horizontal. The two audience targets 50 are for a send and a do-not-send action. The letter 'S' indicates the send action and the letters 'DS' indicate the do-not-send action. The letter 'O' for open indicates the case where no audience target applies to the information consumer.

In FIG. 5, the consumer actions for two selection criteria 65 are shown along the vertical. The two audience targets 50 are for a want and a do-not-want action. The letter 'W' indicates the want action and the letters 'DW' indicate the do-not-want action. The letter 'O' for open indicates the case where no selection criteria 65 applies to the information item 24.

In FIG. 5, the decision matrix 70a used to indicate when the information item 24 should be included in the information stream of the consumer 28 or excluded from the information stream. In the decision matrix 70a a letter 'I' indicates inclusion of the information item 24 into the information stream, and the letter 'E' indicates exclusion of the information item 24 from the information stream. The symbol '?' indicates that the system may decide if the information item 24 is included or not.

In FIG. 6, the table extends the table shown in FIG. 5 to show priorities for the audience targets 50 and selection criteria 65. The producer's audience targets 50 are again along the vertical and the consumers selection criteria 65 are along the horizontal. The producer's audience targets 50 are shown with combined action and preference priority. The letter 'H' indicates a high priority. The letter 'M' indicates medium priority. The letter 'L' indicates low priority. In FIG. 6 six audience target action and priority combinations are shown for the producer 22. For the consumer six selection criteria action and priority combinations are shown. As in FIG. 5, the case where no action targets 50 applies to the information item 24 and the case where no selection criteria 65 applies to the information item are also shown in the table.

The decision matrix 70b has the same meaning as in FIG. 5 but has added combined symbols to show cases where the system might override the default. The symbols 'I?' indicate a case where In one embodiment, the default would be to include the item in the stream but the system may decide to switch the decision. The symbols 'E?' indicate a case where In one embodiment, the default would be to exclude the item from the stream, but the system may decide to switch the decision. The other symbols shown in FIG. 6 have the same meaning as in FIG. 5.

There is no limit on the number of discrete priority levels that can be assigned to audience targets 50 or selection criteria 65. Fewer priority levels may also be allowed so that a combination between the tables in FIG. 5 and FIG. 6 is possible. For the decision matrix 70 with discrete priority level the system can choose what cells to override.

In one embodiment, the priorities may be determined from a continuous function of variables from the producer's user profile 60, the consumer's user profile 60, the meta tagging for the information item 24, external factors, or any other data available to the system. The priority from the continuous function can be of any scale, and the scale can be infinite or fixed or normalized, for example normalized to the zero to one interval.

For the case of continuous priorities the decision matrix 70c may contain a logical function for each combination of actions for the producer 22 and the consumer 28 in the decision matrix 70c as shown in FIG. 7. The logical function can evaluate the priorities for the producer and consumer actions along with other factors discussed below to determine if the information item 24 is included in or excluded from the stream.

Any combination of the decision matrix 70 shown in FIG. 5-7 may be possible. For example, the consumer might have several priority levels for a want action one priority for the do-not-want action and the producer may have continuous priority for the send action and three priorities for the do-not-send actions.

In one embodiment, the processing of the decision matrix 70 may be integral with the information exchange 29 default distributor 26. In another embodiment, the processing of the decision matrix 70 may be external to the default distributor 26. In one embodiment, the processing of the decision matrix 70 may be distributed between the default distributor and an external process. In another embodiment, the decision matrix 70 can be partially evaluated to identify eligible consumers and the remaining processing of the decision matrix 70 can be completed to refine the consumers that will have the item included in their stream.

In one embodiment, the producer sees the descriptions for the do-not send priorities similar to "never send", "prefer not to send", "ok if they get it but don't include in my counts" translating to high, medium, and low priority.

In one embodiment, the action priorities for a consumer want action may be represented with descriptions similar to "must have", "ok to have", "give to me if it might be important" translating to high, medium, and low priority.

In one embodiment, a decision grid 70d represents the decision matrix 70 for the case of discrete, continuous, or mixed priorities as a two dimensional interval with a range of [1, −1] for each dimension. The actions for do-not-want and do-not-send multiply their priorities by −1 and the open case is represented by 0. The two dimensional interval is equivalent to any non-normalized two dimensional interval. A threshold line 71 separates the interval from an include region 72 and an exclude region 73. The threshold line or boundary can be derived from the metrics 54 and can be represented by a threshold function, mapping, or relation.

In one embodiment the exclude region 73 may be divided into a reachable exclude range and a non-reachable exclude range. The reachable exclude range may be defined as the part of the exclude region below the threshold line 71. The reachable exclude range may also be defined as the part of the exclude range that may be reached by the producer, if the producer can increase the priority of the audience target matching that consumer.

In one embodiment, there may be a priority bounds in the decision grid or decision matrix where the threshold line may not cross.

In the discrete case the threshold is a set of cells that form the boundary of the include region 72 and exclude region 73. For example, in FIG. 6. the threshold set would be the boundary along any row or column where there is a switch from include to exclude. A range or subset of the decision matrix 70 is a set of cells or regions in the two dimensional interval.

Use of Metrics

In one embodiment, a consumer participation metric may be used as a measure of information item consumption or interaction with the information item. The consumer participation metric may be obtained or computed from views, interactions, clicks, opens or any other applicable indicator of information item consumption by the consumer and useful to the information exchange. In one embodiment, the participation metric may be exact. In another embodiment, the participation metric may be estimated. In one embodiment, the participation metric may be the number of items participated in for a specified period.

In one embodiment, the consumer participation metric for specific periods useful to the information exchange may be stored in a database. In one embodiment, all historical data used for computing or obtaining the consumer participation metric may be stored in a database.

In one embodiment, a participation rate for the information consumer 28 may be measured as the number of information items participated in divided by the number of information items delivered or sent or made available to the consumer over a specified period (for example a day). In one embodiment, the participation rate may be obtained from other sources including surveys, monitoring, or other internal and external metrics.

In one embodiment, an historical participation rate may be computed for each consumer. The historical participation rate can be computed in any number of ways from prior participation of the consumer. For example using weighted history, rolling average or other computations. Multiple measures of historical participation can be used. In one embodiment, the historical participation rate for each consumer may be maintained in a database. In one embodiment, all historical data used for computing or obtaining the consumer participation rate metric may be stored in a database.

In one embodiment, a consumer item value for the information item may be estimated for the consumer using the priority established from the selection criteria of the consumer. In one embodiment, the priority of the information item may be the highest priority of matching selection criteria. In another embodiment, the consumer item value may be computed from the priority of overlapping selection criteria. In one embodiment, the item value may be computed from the priority and other metrics.

In one embodiment, a mapping of priority to value for the consumer may be used. In another embodiment, the consumer value and priority may be assumed to be equivalent.

In one embodiment, an average consumer item value may be computed for a period of time. The average consumer item value may be computed as the sum of the consumer item value for items participated in for the period divided by the number of items participated in for the period. In one embodiment, a weighted average may be used to compute the average consumer item value with weights depending on information item meta data or other metrics. In one embodiment, a historical time series of average consumer item value may be computed. In one embodiment, the historical time series of average consumer item value may be maintained in a database.

In one embodiment, the historical time series of average consumer item value may be used to estimate a consumer expected item value for an information item the consumer has not yet received. Multiple formula specific to the information exchange can be used for this estimate. For example using weighted history, rolling average or other computations. Multiple measures of the expected item value can be used. In one embodiment, the expected item value may be computed from the historical average consumer item value and other metrics.

In one embodiment, the expected item value may be computed or obtained from, surveys, sentiment analysis, or other metrics.

In one embodiment, a predictive participation rate may be computed. In one embodiment, the predictive participation rate may be derived from statistical or predictive analytics using the historical participation rate and internal and external metrics and signals. In one embodiment, the predictive participation rate may be the same as the historical participation rate.

In one embodiment, a participation prediction mapping may relate the expected item value to a predicted participation level. The predicted participation level may represent a number of information items per specified period. The participation prediction mapping may be a discrete, continuous, or mixed logical function or mapping. In one embodiment, statistical methods appropriate to the information exchange may be used to compute and derive a predictive participation formula or mapping using the consumer expected item value and additional internal and external metrics and signals. In one embodiment, the participation prediction mapping may be determined using metrics from other consumers.

In one embodiment, an inverse participation prediction mapping may be used to relate the participation level to an expected item value.

In one embodiment, a producer item value per consumer may be the value to the producer for the consumer to receive and consume an information item. The producer item value may be computed using the priority established from the audience targets for that information item. In one embodiment, the producer item value for a consumer may be computed from the priority and other metrics.

In one embodiment, a mapping of priority to the producer item value per consumer may be used. In another embodiment, the producer value and priority may be assumed equivalent.

In one embodiment, a distribution of information items on the two dimensional decision matrix 70 or decision grid may be computed for each consumer. The distribution records the number of information items for a time period for each point in the decision matrix 70 or decision grid 70d. Any number of techniques specific to the information exchange can be used for recoding the distribution based on historical data. For example using weighted history, rolling average or other computations. Multiple distributions are possible and can be used for different purposes in computing other metrics. In one embodiment, aggregations of distributions across information consumers may be used.

In one embodiment, the historical distribution of information items and optional additional metrics may be used to compute a predicted distribution of information items for a consumer in a current period or a future period. In one embodiment, the distribution of information items for specified future period may be predetermined.

In one embodiment, a targeted consumer expected item value may be computed from the metrics to determine the information exchange desired expected item value for each consumer.

In one embodiment, the threshold line 71 of the decision matrix 70 or decision grid 70 may be computed using the predicted distribution of information items for a consumer, the mapping of priority to value for the consumer, the mapping of priority to value for the producer, the participation prediction mapping, the consumer expected item value, the targeted expected item value, or other metrics.

In one embodiment, an exchange value function may be specified to indicate a combined value to the exchange for each point on the grid. For example, the exchange value function might be $T(p,c)=ap+bc$ where p=producer value, c=consumer value, $a=1$ if $p>0$ and 2 if $p<0$, $b=1$ if $c>0$ and $b=2$ if $c<0$. Functions of this type encapsulate the trade off when consumer item value or producer item value is negative. Other functions could be used depending on the goals of the information exchange and the function could vary by consumer, temporal parameters, or other internal or external parameters particular to the exchange. In one embodiment, the exchange value function may define the priority bounds.

In one embodiment, a number of information items over a region of the distribution of information items may be computed as the sum over every point in the region. For example the distribution might indicate that the number of items is 5, 4, 7, 3, 11 for 5 points defining the particular region. The sum of information items over this region is 30.

In one embodiment, an average consumer value over a region of the distribution of information items may be computed as the sum of the consumer value times distribution value over every point in the region divided by number of information items in the region.

In one embodiment, the threshold line 71 may be computed for the distribution of information items as the region inside the decision grid 70d where the predictive participation level from the participation prediction mapping for a specified expected item value is approximately equal to the number of information items in the region. In one embodiment, the specified expected item value may be the average consumer value over the region of the distribution. In another embodiment, the specified expected item value may be determined from internal and external metrics.

In one embodiment, the include region 72 may be chosen for a specified distribution of information items by first dividing the decision grid 70d into discrete points. For example to divide the decision grid consumer and producer priority axis into 10ths would yield 20×20 or 400 discrete points. For the decision matrix 70 use the cells as the discrete points. Second, evaluate the exchange value function at each discrete point on the decision grid to determine the points to include first in the region. Third, sequence through the points in descending preference order and compute the number of information items over the region incrementally at each point, and also compute the expected item value using the average consumer value over a region or other metrics to get the expected item value. Fourth, evaluate the predictive participation level from the participation prediction mapping for the specified expected item value, and when predictive participation level is less than the number of items stop. Fifth, use the processed points to define the include region 72 and the threshold line 71.

In one embodiment, the distributions of information items that may be relevant for the consumer may be stored in a database. The distributions may be updated in real-time. The threshold line 71 may be updated in real time as the distributions or other metrics change.

In one embodiment, a consumer data collection may include the selection criteria, distributions, decision matrix, threshold line, and other consumer metrics. In one embodiment, the consumer data collection may be stored on contiguous storage for fast access and processing.

In one embodiment, a consumer audience details query method can be used to evaluate the information item, the audience targets, the consumer data collection, or other internal metrics to determine a set of consumer audience details that may include, but not limited to, the consumer priority, the producer priority for that consumer, the producer priority on the threshold line (if applicable), and an indicator of the range (exclude, include, or reachable exclude).

In one embodiment, the consumer audience details query may use a list of meta tagging groups, fields, and values to evaluate a consumer priority responsiveness to meta tagging. The consumer audience details query method may logically evaluate the list of meta tagging groups, fields, and values against the selection criteria to determine the consumer priority that would be assigned to each meta tag option in the list and may also include relevant combinations. The consumer priority responsiveness to meta tagging may include priority levels of the items in the list and may also include summaries by field, group, and selection combinations.

In one embodiment, an audience details query method can evaluate the consumer audience details method for each consumer to compute and aggregate a set of audience details. The audience details can be presented to the meta data control loop, the audience limits control loop, the audience target control loop, the system interface for inputting audience targets, or the system interface for inputting the information item.

In one embodiment, a sufficiently sized statistical sample of the consumer's selection criteria and consumer data collections may be used instead of actual consumer data to provide an estimate of the audience details.

In one embodiment, the audience details for individual audience targets may include, but not limited to, raw audience size, incremental audience size, accumulated audience size, audience size limits imposed priority, audience size in the include range, audience size in the reachable exclude range, or average producer priority change needed to move from reachable exclude region. The audience details for all audience targets specified may include, but not limited to, max audience size for all targets, or accumulated size for all targets. The audience details for an information item may include, but not limited to, distribution of consumer priority for the information item, user profile summary statistics for specific priority ranges, or priority responsiveness to meta tagging.

In one embodiment, the consumer priority responsiveness to meta tagging can be aggregated and summarized across all consumers to get the responsiveness to meta tagging values.

Control Loops

A set of control loops use metrics 54 to control the flow of information items in the information exchange. The metrics are measures and parameters that may be internal to the information exchange or external to it. Sample internal metrics include, but are not limited to, metrics related to producer, consumer, system information flow, or the information exchange in general. Sample external metrics include, but are not limited to, indications of important sporting events occurring that day, severe weather, day of week, political or business events occurring, measures of news and information flow or activity external to the information exchange, flow activity on external information exchanges, historical projections, statistics, or any other relevant data.

One embodiment may have multiple control loops. Another embodiment may have a single control loop. Another embodiment may have no control loops.

Decision Matrix Control Loop

In one embodiment, a decision matrix control loop adjusts the threshold line 71 or the boundary of the include region 72 and exclude region 73 in the decision matrix 70 or decision grid 70*d* to improve or maintain a set of success metrics.

In one embodiment, if the point on the decision matrix 70 or decision grid 70*d* represented by the selection criteria priority and audience target priority is within the include region 72 defined by the threshold line 71 for the consumer, the information item is included in the consumer's information stream.

In one embodiment, the decision matrix control loop may use the set of success metrics derived from the consumer, the producer, the information item, audience targets, external sources, or from the system in general. The metrics related to the consumer include, but are not limited to, the time processing the information stream, estimate of missed information items, participation metrics, participation rate, average selection criteria priority for the information stream over recent and historical periods, the consumer expected item value, predicted participation rate, predicted participation level, or other consumer metrics. The metrics related to the producer include, but are not limited to, user profile data including producer historical, performance, or behavioral data. The metrics from external sources could include, but are not limited to, indications of important sporting events occurring that day, severe weather, day of week, political or business events occurring, measures of news and information external to the information exchange, or any factor deemed relevant to the prediction of the attention and focus of the consumer. In another embodiment, only some of the metrics may be used or only one metric may be used.

In one embodiment, the decision matrix control loop may be part of the distribution sub-system 52.

In one embodiment, for each information item 24 processed by the decision control loop a consumer priority may be obtained from the consumer's selection criteria 65 and a producer priority may be obtained from the audience targets 50 for that information item.

In one embodiment, multiple information items may be processed at one time as a distribution of information items on the decision grid 70*d* or decision matrix 70 and the include region 72 can be computed to determine which information items may be included in the consumer's information stream. In one embodiment, information items may be delayed or queued to be evaluated together as a distribution of information items.

In one embodiment, an estimated value of the probability the information item will be missed, meaning it will be received but is not processed by the consumer, may be derived from the metrics. A system limit for the probability the information item will be missed may be derived from the metrics. Within the specified range or subset of the decision matrix 70, if the estimated value of the probability the information item will be missed is greater than the system limit for this estimate the information item is excluded. In one embodiment, within the specified range or subset of the decision matrix 70, if the consumer item value is greater than the consumer expected item value, the information item is included.

Producer Limits Control Loop

The producer limits control loop 46 determines an audience size limit to be placed on the producer's audience targets 50 at a particular priority level.

Figure 9:
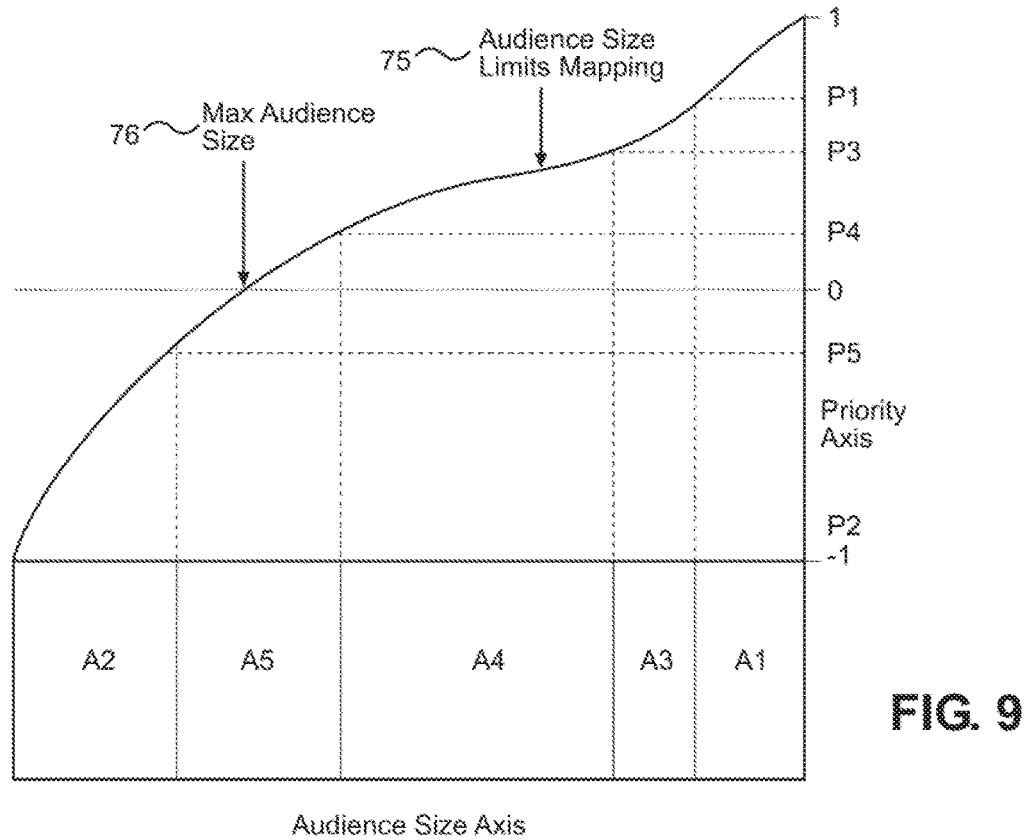

FIG. 9 shows an embodiment where the audience size limit may be represented as an audience size limits mapping 75. The audience size limits mapping 75 can be used to get a priority for a given audience size or to get an audience size for a given priority. The audience size limits mapping 75 can be a function or relation between priority and the audience size limit. The mapping can be continuous, discrete, or mixed. FIG. 9 show the audience size limits mapping 75 as a continuous mapping.

In one embodiment, the audience size limits mapping 75 may be first determined by the metrics 54. The metrics 54 can include, but is not limited to, the current number of information items flowing through the system, the relative number of consumers receiving too few or too many items, or the predicted number of information items flowing through the system in the future. The audience size limits mapping 75 may be adjusted using meta data and contents of the information item 24, and may be further adjusted using metrics from the producer's user profile that include, but are not limited to, expertise, background, reputation, number of prior sends by the producer, interaction rates or performance of past information items sent by the producer.

In one embodiment, the audience size limits mapping 75 may be dynamically determined in real time. In one embodiment, a base audience size limits mapping may be set by an administer and the base set of levels may be adjusted or not adjusted in the producer limits control loop 46.

In one embodiment, max audience size 76 may be determined from the largest limit in the audience size limits mapping 75 with positive priority. In one embodiment, the total audience the producer could reach may not exceed the max audience size 76.

Figure 10:
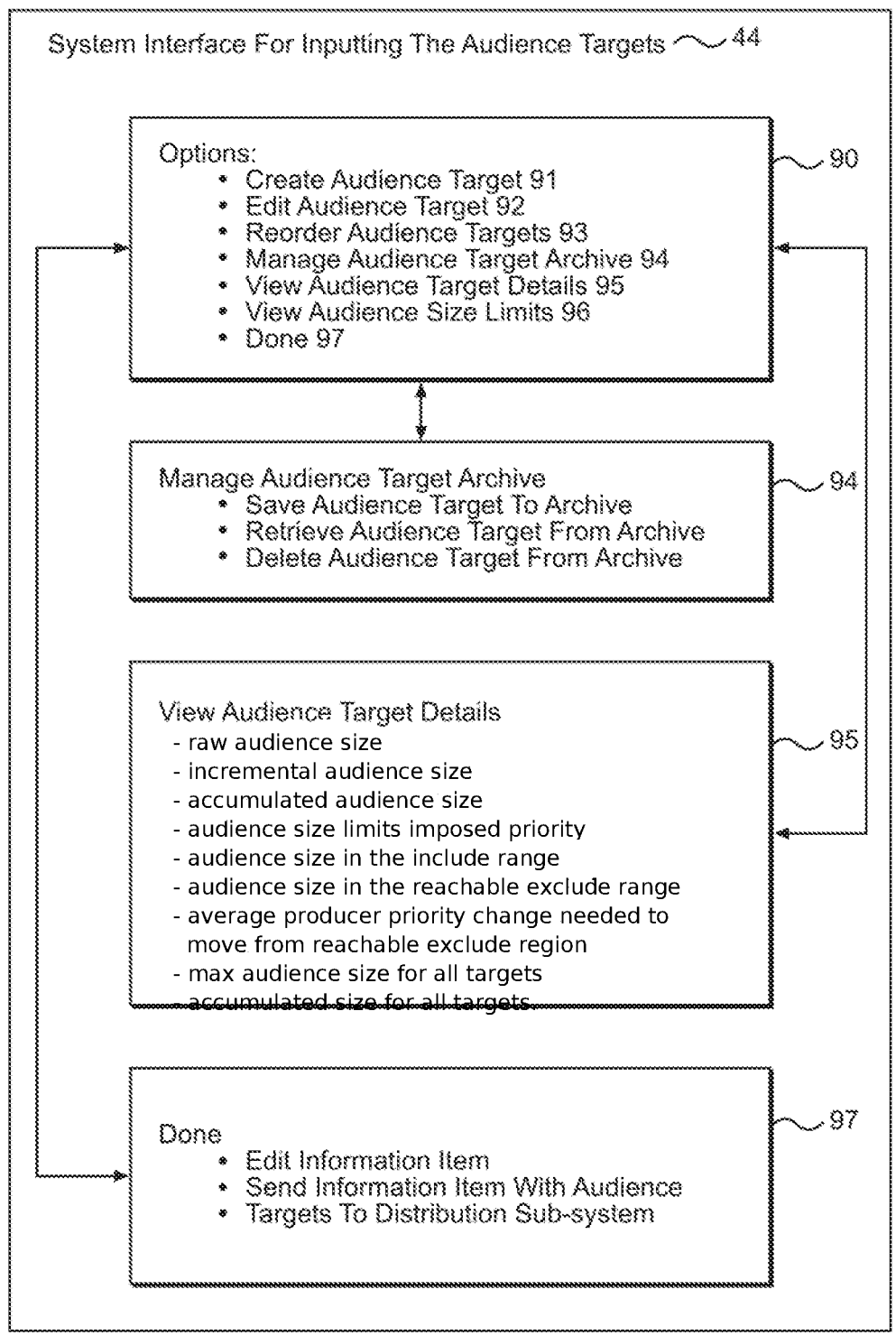

FIG. 10 shows one embodiment of the system interface for inputting the audience targets 44. Options 90 allow the producer 22 to create audience target 91, edit audience target 92, reorder audience targets 93, manage audience target archive 94, view audience target details 95, view audience size limits 96, or complete the process when done 97.

In one embodiment, the producer 22 may interact with the producer limits control loop 46 to first create an audience target or retrieve an audience target from the archive. After the first audience target is entered, the audience target can be evaluated and the audience target details 95 can be viewed and processed by the producer 22. The producer 22 can accept the priority level, reorder the audience targets 93, or edit the audience target 92. If the priority level for the audience target is accepted, the producer has the option to enter an additional audience target. If the producer enters the additional audience target, the process used for the first audience target can be repeated. If the combined audience from all audience targets exceeds the max audience size 76, the producer can reorder the audience targets 93 or edit the audience targets 92. In one embodiment, each additional audience target may have lower or higher priority than the first audience target entered depending on the order and audience target action.

In one embodiment, the audience targets may be evaluated by the order specified by the producer to determine an incremental size for that audience target. The incremental audience size can be the size of the additional audience that can be reached by each subsequent lower ordered audience target. FIG. 9 shows the ordered audience targets as A1-A5. As an example consider the audiences for audience targets A1, A3, and A4 as audience targets where the producer wants to include or send the information item and A2 and A5 as audience targets where the producer wants to exclude or not send. The audiences for targets A1-A5 are evaluated to obtain the incremental size. The incremental size for the audience targets with an include action (A1, A3, and A4 in this example) may be accumulated down the order to get an accumulated size for the audience target. The incremental audience excludes any consumer that would match one of the audience targets of a higher order. In one embodiment, the accumulated size for the audience targets with the include action adds the incremental size for that audience target as well. The accumulated size can then be evaluated from the audience size limits map 75 to determine the priority for that audience target. In FIG. 9, the audience targets A1, A3, and A4 have priorities P1, P3, and P4 assigned respectively. In one embodiment, the accumulated size may be used as a lookup size to get the priority from the audience size limits map 75. In one embodiment, accumulated size may be adjusted by a fraction of, or all of, the incremental size.

In one embodiment, the incremental size for the audience targets with an exclude action (A2 and A5 in this example) may be accumulated down the order to get an accumulated size for each audience target with the exclude action. In one embodiment, the accumulated size for the audience targets with the exclude action does not add the incremental size for that audience target. The accumulated size can then be evaluated from the audience size limits map 75 to determine the priority for that audience target. In FIG. 9 the audience targets A2 and A5 have priorities P2 and P5 assigned respectively.

In one embodiment, the producer may assign any priority to audience targets with an exclude action.

In one embodiment, the audience targets may be automatically adjusted to improve the audience size using the audience size limits mapping, by first identifying an audience that would be included at a low priority; second, generating the audience target for the identified audience; third, assigning that audience target a priority directly and placing it in the appropriate audience target order; and fourth, exclude the incremental audience from the accumulated size, and exclude it from the incremental counts of the subsequent targets.

In one embodiment, audience targets with an include action may be processed provided the priority is >0. In one embodiment, the audience target that may have accumulated sizes that exceed the max audience size 76 by less than the incremental size for the audience target may be limited by the system to a size that will not exceed the max audience size 76. In another embodiment, the producer may have the option to refine the audience target that crossed the limit.

The audience size for an audience target could be an estimate in one embodiment, or an exact number in another embodiment.

In one embodiment, the number of audience targets may be limited.

In one embodiment, the producer enters one or more audience targets. The system then automatically ranks the audience targets by audience size and assigns priorities using the methods above.

In one embodiment, the producer may specify a priority preference over a range of user profiles as $F(X)$ where $X$ is a user profile from a span of user profile characteristics. For example specifying age between 30 and 40 with 30 being the most preferred. Using $F(X)$ a rank of every potentially targeted user profile is obtained. The mapping between priority in the [0, 1] interval and audience size limits mapping 75 is used to assign a priority to each incremental target from highest rank to lowest and stopping when the max audience size 76 or the span of $X$ is reached.

Methods for Determining the Audience Size Limit Mappings

In one embodiment, the audience size limit mapping 75 may be determined using the reverse cumulative distribution of the consumer population density over the priority on a normalized interval $[-1, 1]$ for the information item. The reverse cumulative distribution is the number of consumers whose selection criteria would register a given priority or higher for the information item. The consumer population density for an information item is the number consumers at each consumer priority level, and this can be obtained by accumulating the counts of consumers at each priority level. The reverse distribution is then obtained from cumulations of the population density starting at the top of the interval $[-1, 1]$. In one embodiment, only the population density and reverse cumulative distribution on the interval $[0, 1]$ may be needed. In one embodiment, consumers with similar selection criteria may be aggregated in a map reduced representation with the representative selection criteria and the number of consumers. This is so that only one representative consumer needs to be evaluated for the set of similar consumers. In one embodiment, the reverse cumulative distribution may be used directly as the audience limit mapping. In another embodiment, the reverse cumulative distribution may be scaled or adjusted before being used as the audience limit mapping. The advantage of using reverse cumulative distribution is that it provides higher limits to the producer 22 that would have a natural consumer priority for the information item 24. For example, a popular merchant providing an information item about a free give away or a popular news organization with exclusive breaking news might have a large number of information consumers 28 who place a high priority on receiving such information items. In such a case the producer may not be required to enter any audience target at all because the default priority level is already sufficiently high. On the other hand, a product vendor with an information item 24 that is a marketing message of value to only a small group of information consumers may have a very restrictive audience limit mapping and may need to input very specific audience targets.

In one embodiment, the audience limit mappings may be determined from the producer's send history, past activity and keyword or other mechanical analysis of the information item.

In one embodiment, with discrete or continuous audience size limits the parameters of the audience size limits mapping may be determined from the metrics. For example in the continuous case a linear relationship between size and priority could be used and the metrics would determine the slope and intercept of the line. More specifically, in this linear example, with the priority on a [0, 1] interval the parameters would be the priority level for the max audience size 76 and at audience size zero. Other mathematical functions, mappings and parameterized relationships can be used also, with the parameters of such functions, mappings, and relationships determined by metrics in a similar manner.

Producer Request Control Loops

The producer request control loops may consider the impact that requesting the producer to provide additional meta data and audience targets has on the number of information items the producer may send or contribute over time as well as the perceived impact of the additions to the information item with the consumer. The producer request control loop may use metrics that include, but are not limited to, the opportunity cost of time for the producer, the time the producer is taking to complete a send, the time to get additional requested data, the availability of additional data, the value of additional meta tagging or refinements, time the producer takes to enter a new audience target, or the time taken to change, rank or prioritize audience targets. Consumer perception, participation, or response metrics may also be used.

In one embodiment, the producer request control loop may be used for controlling the input of the information item meta data via the meta data request control loop 42. In one embodiment, the producer request control loop may be used for controlling the input of the audience targets 50 through the audience target request control loop 48. In one embodiment, the producer request control loops may supplement the producer limits control loop 46. In another embodiment, the producer request control loops may be an alternative to the producer limits control loop 46.

In one embodiment, a subject domain for the information item may be determined by automated analysis of the information item as entered by the producer. The subject domains may be used to get a list of meta tagging schema and usage data for the subject domain that was determined. The list of meta tagging schema and usage data may be used to generate the list of meta tagging groups, fields, and values that could be provided to the audience details query method. The responsiveness to meta tagging with audience size increments for the specified meta tagging that may be provided by the audience details query method can be used to get the audience size increments that can be used to select the order that the meta tagging questions are requested.

In one embodiment, the list of meta tagging schema may be general. In another embodiment, the meta tagging schema may be subject domain specific.

In one embodiment, the list of meta tagging schema may be selected to complete meta data that could not reliably be provided by the automated analysis, or to confirm known fields, or to confirm the expertise of the producer. This can also be used to limit autonomous and non-autonomous producers.

In one embodiment, the producer may not see the audience sizes associated with the specified meta tagging.

In one embodiment, a desired audience distribution may be used to regulate the producer request control loops. The audience distribution can be parameterized by statistical measures or metrics to quantify desirability. For example, to have a distribution over consumer priorities interval that reduces the density at or near zero.

In one embodiment, the meta data request control loop may use the audience distribution over the consumer priority interval. Using the audience distribution over the consumer priority interval has advantages in that the well know producers with naturally high audiences and receptiveness can avoid extra requirements for meta tagging or audience targets and the associated time burden.

In another embodiment, either the meta data request control loop or the audience request control loop may use the audience distribution over the two dimensional decision grid or decision matrix, and the desired audience distribution can be over both consumer and producer priorities. The information producer can use either the meta data request control loop or the audience request control loop to reach the desired audience distribution.

In one embodiment, any required meta data requests or audience target requests may stop when either the desired audience distribution has been reached or a maximum number of requests to the producer has been made.

The subject domain may be compared to the subject domains that can be inferred from the user profile of the producer and the prior information items produced by the producer. If the implied subject domains of the information item do not align with the subject domains of the producer and the producer's history, the meta data questions may be asked to confirm the validity of the post and the sender.

Control Loop Admin

An administrator of the information exchange can select the control loops to use and set the configurations for the control loops. The success metrics can be targeted to balance the value to the different users of the exchange with the goals of the information exchange stakeholders.

CONCLUSION

The computer system described here is broadly applicable to existing information exchanges or as basis for new information exchanges to optimize and better engage participants.

Examples and variations given in this specification are not limiting and other examples and variations will be apparent to those skilled in the art.

What is claimed:

1. An information exchange apparatus for limiting audience target priority, comprising of:
   an audience size limits map;
   at least two audience targets having a specified order;
   a means for computing an audience size for the audience targets, wherein the means for computing considers the specified order of the audience targets;
   a means for determining the priority for the audience targets, wherein the means for determining uses the audience size and the audience size limits map.

2. The apparatus of claim 1, further comprising:
   a means for determining the audience size limits map.

3. A system interface for inputting audience targets, comprising:
   one or more audience targets;
   audience details, wherein the audience details include priority or audience size for each audience target;

a means for interacting with a producer limits control loop to obtain the audience details;

a means for interacting with an information producer, wherein the means for interacting includes options for:
(a) inputting the one or more audience targets,
(b) viewing the audience details,
(c) editing the one or more audience targets,
(d) reordering the audience targets,
(e) indicating completion, whereby the audience targets are accepted and sent to a subsystem.

4. A method for assigning audience target priority, comprising:

an audience size limits map;

at least two audience targets having a specified order;

a step for computing incremental size for one or more of the audience targets;

a selected audience target lower in the order than at least one other audience target;

a step for determining a lookup size for the selected audience target using the incremental size of the audience targets with higher order and the incremental size of the selected audience target; and assigning a priority for the selected audience target using the lookup size and the audience size limits map.

5. A method for assigning priority to user profile characteristics, comprising the method defined in claim 4, further comprising:

a preference order over a range of user profile characteristics;

a set of audience targets, wherein each profile characteristic is an audience target;

ordering the audience targets using the preference order;

assigning the priority determined for the audience target to the corresponding profile characteristic.

6. A system interface for inputting audience targets using the method of of claim 4, comprising:

a means for obtaining at least two audience targets;

a means for ordering the audience targets;

audience details, wherein the audience details include audience size and priority;

a producer limits control configured to compute the audience details using the method of claim 4 with the at least two audience targets.

7. An information exchange apparatus using the method of claim 4, comprising:

two or more audience targets, wherein the audience targets are ordered;

a means for limiting priority for the audience targets, wherein the means of limiting uses the method of claim 4, and wherein a producer priority is obtained for each audience target;

a decision grid;

a means for determining inclusion of an information item into an information stream of at least one information consumer using the decision grid and the producer priority obtained.

8. A method for determining an audience size limits map comprising:

an information item;

a set of information consumers or representative information consumers;

a step for determining a priority level for the information item for each of the information consumers in the set;

a step for obtaining a population density, wherein the step uses the priority level for each of the information consumers in the set;

a step for obtaining a reverse cumulative distribution, wherein the step uses the population density;

a step for using the reverse cumulative distribution to determine the audience size limits map.

9. A method for obtaining a priority from an audience target, comprising the method defined in claim 8, further comprising:

an audience target;

an audience size for the audience target;

looking up a priority for the audience target using the audience size limits map with the audience size.

10. A system interface for inputting audience targets using the method of claim 9, comprising:

a means for obtaining one or more audience targets;

audience details, wherein the audience details include audience size and priority;

a producer limits control configured to compute the audience details using the method of claim 9 with the one or more audience targets and an information item.

11. An information exchange apparatus using the method of claim 9, comprising:

one or more audience targets;

a means for limiting priority for the audience targets, wherein the means of limiting uses the method of claim 9, and wherein a producer priority is obtained for each audience target;

a decision grid;

a means for determining inclusion of an information item into an information stream of at least one information consumer using the decision grid and the producer priority obtained.

* * * * *